March 26, 1968 S. A. McDONALD 3,374,613
FRUIT PICKER
Filed July 21, 1965 2 Sheets-Sheet 1
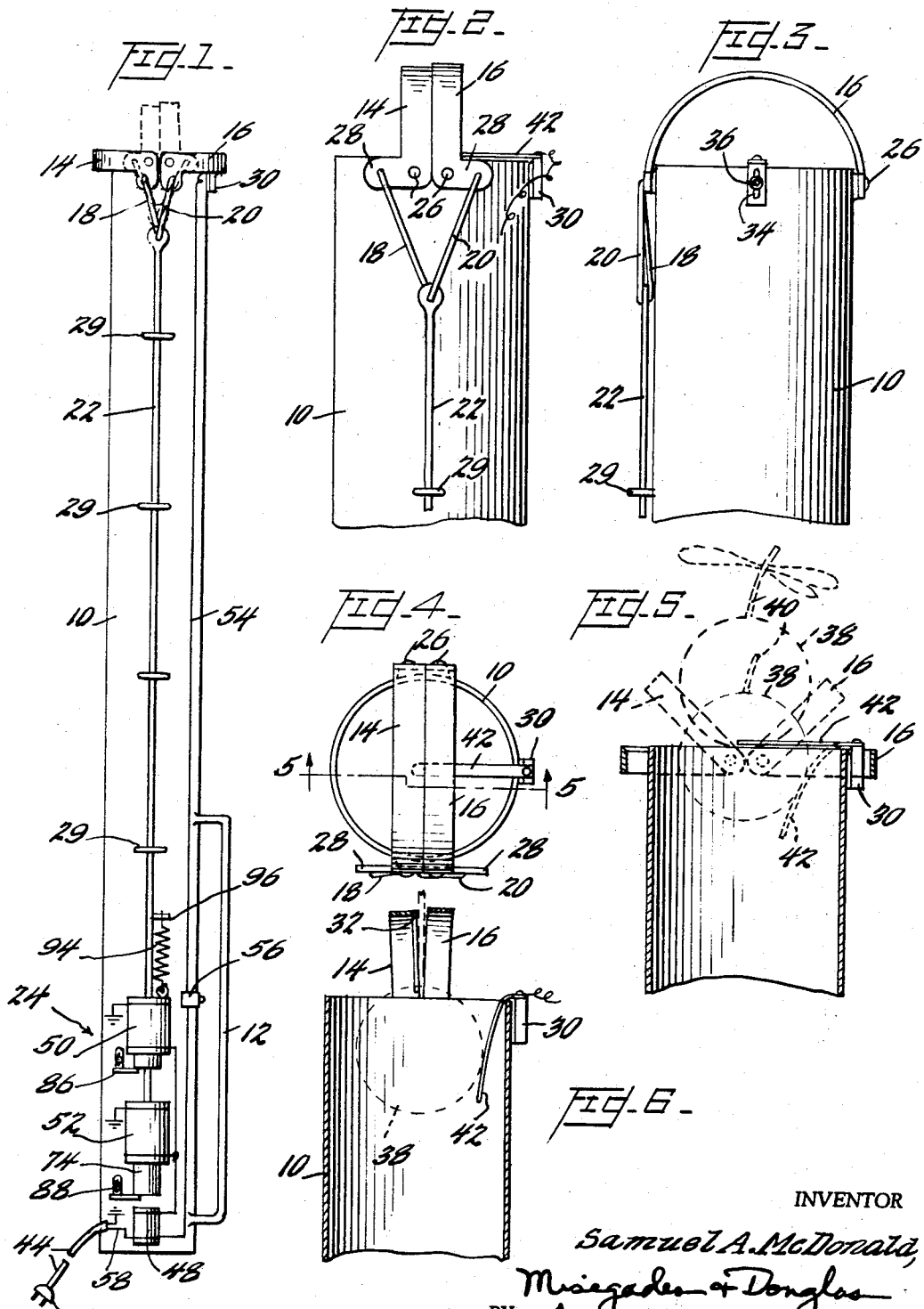
INVENTOR
Samuel A. McDonald,
BY Misegades & Douglas
Keith Misegades
ATTORNEYS

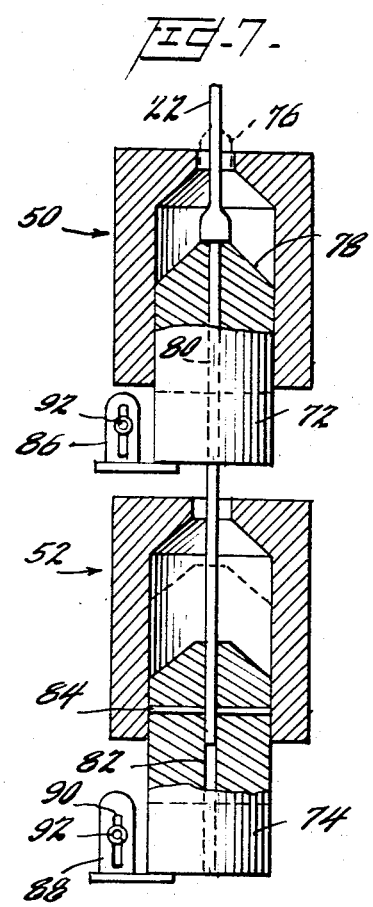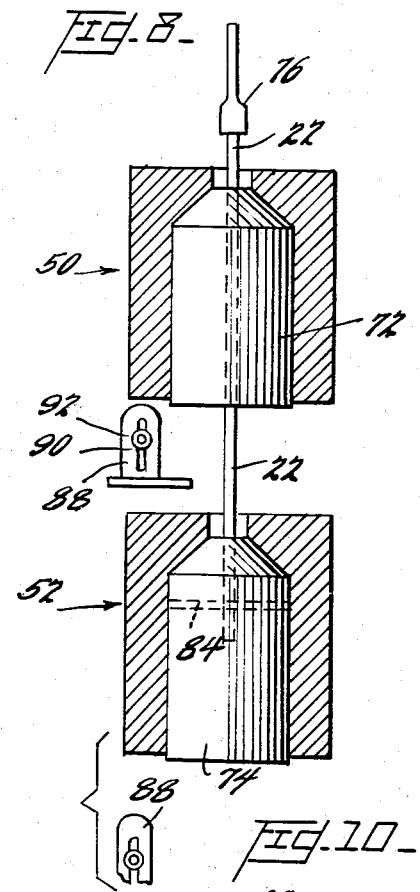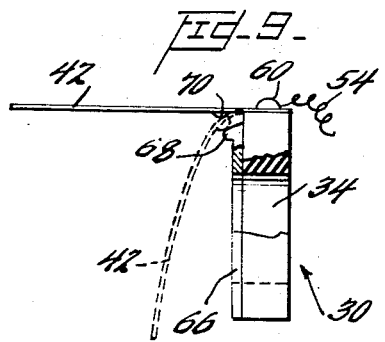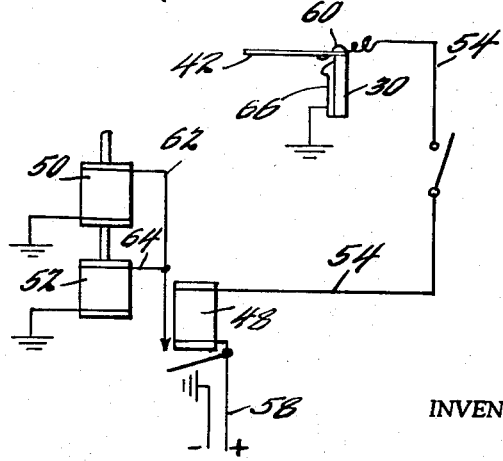
INVENTOR
Samuel A. McDonald,
BY Misegades & Douglas
Keith Misegades ATTORNEYS

United States Patent Office 3,374,613
Patented Mar. 26, 1968

1

3,374,613
FRUIT PICKER
Samuel A. McDonald, 626 S. Banana River Drive,
Merritt Island, Fla. 32952
Filed July 21, 1965, Ser. No. 473,618
13 Claims. (Cl. 56—334)

This invention relates generally to the harvesting art, and more particularly, to an improved picker for fruit grown in orchards, electrically operated and automatically energized. The invention is particularly well adapted for use with citrus fruit, but as will become apparent below, may be used with virtually any type of fruit grown on trees.

In recent years, the need for a reliable and efficient fruit picker has become particularly acute in the citrus fruit industry. The minimum wage levels, established in industry, where men are aided with much machinery, cannot be sustained in those branches of agriculture employing hand labor without pricing the farm product out of the market. When laborers were in plentiful supply, it was economically feasible to give each man a sack, a ladder, and a pair of shears, and to send him off to the orchard to pick citrus fruit. The individual operation was slow and tedious, and involved backbreaking labor, as a fully loaded sack of fruit weighed in the neighborhood of 100 lbs., but with a large labor supply, the job could be accomplished.

With diminished supply of manpower and increased hourly rates, virtually the only remaining solution for the citrus industry is to find an efficient mechanical fruit picker, which will increase the productivity of the individual while of simple construction and operable by the available labor supply.

Generally speaking, the invention includes an elongated tubular chute having a handle set at one end so that the device may be grasped by an operator. The opposite end of the chute is open, and has an internal diameter slightly greater than that of the fruit to be picked, so that the fruit may slide down the tube, interiorly thereof, to a bag or oher receptacle. A pair of pivoting cutting jaws are mounted over the open end of the chute. The jaws are so designed as to cut the stem of the fruit as close to the surface of the fruit as possible. This operation is extremely important, in that a projecting stem on the fruit will damage other fruit when it is handled and loaded for shipment. A completely automatic electric energizing means is provided for the jaws to assure that the fruit will be properly picked and to negate possible human error. The jaws are activated by the fruit itself as it touches a switch, thus completing a motorized, electric circuit. The switch is located at the open end of the tube directly beneath the pivoting cutting jaws; thus the operator of the invention has no more to do than to direct the open end of the tube toward the fruit for a neat, clean, picking operation.

The preferred embodiment of the invention is adapted to be operative from a 12 volt, direct current electric power source, as is conveniently found in vehicles used in most orchards. In the alternative, the operator of the invention may carry the electric source, such as a battery, with him on a picking operation.

It is therefore the principal object of the invention to provide a friut picker which is completely automatic in operation.

Another object of the invention is to provide a fruit picker of the above character operative completely and solely by electric power.

Yet another object of the invention is to provide a fruit picker, automatically operated by the fruit to be picked.

Still another object of the invention is to provide an automatic fruit picker having as few moving parts as practicable.

Finally, it is an object of the invention to provide an automatic fruit picker which is light in weight, easy in mode of operation and inexpensive in costs of construction and maintenance.

These and further objects of the invention and details of construction may be had by reference to the following detailed specification and drawings in which:

FIG. 1 is a side view of the complete invention, showing the working parts thereof;

FIG. 2 is a partial view of the operative end of the device as shown in FIG. 1, and drawn to an enlarged scale;

FIG. 3 is a view similar ot FIG. 2, but showing the device rotated 90 degrees about its long axis;

FIG. 4 is a top view of the open end of the invention;

FIG. 5 is a sectional view taken along lines 5—5 of FIG. 4 and showing the operation of the invention in dash lines;

FIG. 6 is a view similar to FIG. 5 showing the fruit passing into the interior of the tube after being separated from its stem;

FIG. 7 is a partial, sectional view of the electric actuating means of the invention, drawn to an enlarged scale, and showing the same de-energized.

FIG. 8 is a view similar to FIG. 7 showing the electric actuating means of the invention after energization;

FIG. 9 is a partial sectional view of the electric switch activated by the fruit being picked; and FIG. 10 is a wiring diagram for the invention.

Referring now to the drawings by reference character, and in particular to FIG. 1 thereof, the invention is shown including an elongated tubular chute 10 having a handle 12 at the lower end thereof which may be grasped by an operator of the device. As mentioned above, the internal diameter of the tube 10 depends on the external diameter of the fruit to be picked, and should be slightly larger than the diameter of the largest fruit to be picked. This permits the fruit, once picked, to slide gently within the tube to the ground or waiting recepacle so that it will not be bruised. Tube 10 is preferably constructed of any lightweight material, strong enough for the purpose of of handling fruit, such as grapefruit or oranges, and resistant to rust, as the invention is designed for use outdoors. In the preferred embodiment, tube 10 is constructed of aluminum. The invention further includes a pair of pivoting, cutting jaws 14, 16, an operating rod 22, connected to the remote end of tie rods 18, 20, and an electric actuating mechanism 24 secured to tube 10 adjacent handle 12.

Referring now to FIGS. 2 and 3, jaws 14, 16 are mounted over the open end of tube 10 by any conventional means, such as rivets 26. Each jaw 14, 16 is provided with an ear 28 to provide anchorage for the rods 18, 20, as shown in FIG. 2. A plurality of sleeve guide members 29, arranged along tube 10, serve to guide movement of operating rod 22. As is apparent from FIG. 2, downward movement of operating rod 22 will cause jaws 14, 16 to open, while upward movement of rod 22 will cause the cutting jaws to close, or assume the position as indicated in FIGS. 2 and 3.

A contact, finger switch 30 serves to close a circuit in the electric actuating mechanism 24 which in turn moves operating rod 22 upward to close jaws 14, 16. The details of construction and operation of this mechanism will be explained below. The vertical placement of switch 30, with respect to FIG. 2, depends upon the diameter of the fruit to be picked. Switch 30 is placed so that when fruit touches the switch to operate the jaws, the junction point of the stem with the fruit will coincide with cutting edge 32 about the lip of jaw 14. Vertical adjustability is provided for the base of the switch 30 by means of a slot 34 therein (FIG. 3) and a bolt through slot 34 to tube 10, indicated by numeral 36.

FIGS. 4, 5, and 6 illustrate the action of jaws 14, 16 in separating a fruit 38 from its stem 40. When fruit 38 contacts resilient finger portion 42 of switch 30, a closing, or cutting operation of jaws 14, 16 is initiated. As FIG. 5 indicates, these jaws will slide gently over the outer circumference of the fruit until they meet, and sever stem 40 from fruit 38. Once severed from its stem, fruit 38 will, by force of gravity, depress finger 42 and fall down tube 10 to the ground or a waiting receptacle, and resilient finger 42 will return to a normal position to be ready for another individual fruit. FIG. 6 indicates fruit 38 passing by resilient finger 42 after being severed from its stem 40.

Turning now to FIGS. 1 and 7 through 10, the details of electric actuating mechanism 24 will be discussed in detail. The mechanism includes connective means to an outside power source such as cord 44 and standard plug 46. Actuating means 24 also includes a relay switch 48, a first solenoid 50, a second solenoid 52, and a lead line 54 to finger switch 30, having a hand switch 56 therein. As mentioned previously, electric power for the invention may be supplied from an ordinary direct current battery used in most vehicles today. Any other electric power source is suitable, but since most orchards include at least several vehicles for transporting materials about, this source is most convenient.

FIG. 10 indicates the wiring diagram for the invention. Hot line 58 from the external power source is connected to a terminal on relay 48. Lead line 54 connects the other terminal of relay 48 with post 60 of contact finger switch 30. Hand switch 56 is inserted in lead line 54 to prevent accidental operation of the invention. Solenoids 50 and 52 are wired in parallel and are energized from relay 48 through wires 62 and 64. Referring to FIG. 9, finger switch 30 is provided with a ground plate 66 having contact point 68 at the upper end thereof. Finger 42 is also provided with a contact point 70, adjacent point 68. Preferred clearance between these two contact points is approximately 0.1 inch; this may be varied somewhat as desired. Finger 42 is constructed of any lightweight, resilient, conductive material such as sheet steel, approximately .007 inch thick. It is apparent that depression of finger 42, while hand switch 56 is closed, will cause relay 48 to be energized, thus passing current to solenoids 50 and 52 for energizing the same. In the preferred embodiment of the invention, tube 10 is constructed of aluminum so that all grounds may be made to said tube. Should tube 10 be constructed of non-conductive material, a ground wire (not shown) may be provided.

Solenoids 50 and 52 are operatively secured to rod 22 so as to actuate cutting jaws 14, 16. Attention is directed to FIGS. 7 and 8 as the best illustration of this construction and operation. The two solenoids are arranged in staggered relationship in order to move operating rod 22 a sufficient distance to close cutting jaws 14 and 16. In order to close the jaws completely, operating rod 22 must move a distance of approximately an inch and a half if the invention is constructed in the preferred manner as explained above. For reasons of economy it is desirable to employ standard solenoids available on the open market. The available solenoids of the proper size and weight range develops a maximum stroke of only three quarters of an inch; thus two of these solenoids are employed in staggered relationship in order to develop the required one and one-half inch stroke.

FIG. 7 indicates the position of core 72 of solenoid 50 and core 74 of solenoid 52 when said solenoids are in a normal, or de-energized position. The lower end of operating rod 22 is provided with a rigid collar 76 which abuts against upper face 78 of core 72 in this position. The remainder of rod 22 is slidably mounted through bore 80 of solenoid core 72 and extends through solenoid 52 to bore 82 in core 74, where it is secured by suitable means such as a pin 84. It will be noted from FIG. 7 that core 72 of solenoid 50 is placed sufficiently within the winding of the solenoid to be energized upon activation of the solenoid field of force from relay 48. When solenoid 50 is activated, core 72 moves upwardly to the position indicated by dash lines in FIG. 7, thereby moving operating rod 22 upwardly by acting against collar 76. At the same time, core 74 of solenoid 52 will be moved to the position indicated by dash lines in FIG. 7 since rod 22 is secured within core 74 by pin 84. In normal position, core 74 is sufficiently external of the winding of solenoid 52 so that it cannot be activated by energy supplied from lead line 64. However, once core 74 is moved by the action of solenoid core 72 to the position indicated by dash lines in FIG. 7, it is sufficiently within the field of force of solenoid 52, activated by relay 48, to be moved to the position indicated in FIG. 8. This staggered relationship then, permits operating rod 22 to be moved half the required distance by solenoid 50, and the remaining half of the required distance by solenoid 52. FIG. 8 indicates the position of cores 72 and 74 when solenoids 50 and 52 are completely energized.

A pair of adjustable stops 86 and 88 are provided below solenoids 50 and 52, respectively, to limit the movement of solenoids 72 and 74 respectively when solenoids 50 and 52 are de-energized. Each stop is provided with a slot 90 therein and a bolt 92 therethrough for selective adjustment of the stop. A return spring 94 is secured between the upper face of solenoid 50 and lug 96 on operating rod 22 to assist in returning rod 22 to the position indicated in FIG. 7, when the solenoids are de-energized.

In another embodiment of the invention, for picking smaller diameter citrus fruit, the electric actuating mechanism may include only a single solenoid 50. In this instance, the three-quarter inch stroke of the solenoid would be sufficient to close jaws 14, 16, by reducing the distance on ears 28 between rivets 26 and the junction of rods 18, 20 with ears 28. Some power may be lost by this reduction, but when cutting the stems of such fruit as lemons, limes and some varieties of small oranges, little power is required. By removing solenoid 52, stop 88 and solenoid core 72 and then decreasing the length of rod 22 so that core 74 fits operatively within solenoid 50, the construction of this embodiment of the invention is completed. Pin 84 is also transferred to the upper solenoid. Likewise, in the event of the availability of a suitable solenoid having the desired core movement, only one is required.

A discussion of the complete operation of the invention is in order. The device is held by means of handle 12 and the open end of the tube 10 is directed toward a single fruit 38 which is to be picked. This movement causes fruit 38 to strike finger 42 of switch 30, depressing the same slightly, thus causing points 68 and 70 to make contact. This contact completes the circuit of relay 48, thus energizing the same and causing solenoids 50 and 52 to be activated. The operating rod then moves upwardly, causing jaws 14 and 16 to close about the outer circumference of fruit 38 by action of tie rods 18 and 20 against ears 28, 28. The closing of jaws 14 and 16 causes fruit 38 to be separated from its stem 40;

the force of gravity will cause fruit 38 to fall within tube 10, and pass finger 42 as indicated in FIG. 6. Once the fruit clears finger 42, the resiliency of finger 42 causes it to return to the position indicated by solid lines in FIG. 9. This in turn causes points 68 and 70 to gap, thus de-energizing relay 48 and solenoids 50 and 52. Under urging of return spring 94, operating rod 22 and solenoid cores 72 and 74 are returned to the normal position as shown in FIG. 7. At the same time jaws 14 and 16 will assume the position indicated by solid lines in FIG. 1 due to the force of tie rods 18 and 20 against ears 28, 28. It can be easily seen that the operation takes place within a matter of a few seconds so that the operator of the invention may proceed quickly to pick another individual fruit.

It is readily apparent therefore, that I have developed a new and highly useful device in the art of fruit picking. This invention completely eliminates the need for ladders, weighty sacks to be carried up the ladders, and clipping shears: the necessary tools of a fruit picking operation without the present invention. The provision of few movig parts together with automatic electric power for the invention enhances the characteristics of this mechanical fruit picker over all other available devices. Thus, I am not to be limited to the exact construction as provided in the above specification, except as may be deemed to be within the scope of the following claims.

I claim:

1. A device for picking fruit by severing the stem thereof comprising an elongated tube, handle means at one end of the tube, a pair of pivoting, normally open, cutting jaws mounted over the other end, opposite said one end of the tube, and actuating means for said pair of jaws including electric actuating means mechanically connected to said jaws, electric circuit means for energizing said electric actuating means, and a normally open contact switch for closing said circuit means, thereby energizing said electric circuit means, said contact switch positioned adjacent said jaws so that an individual fruit may pass between the jaws when open, and press against said switch to close said circuit, thereby causing said jaws to be closed to sever said individual fruit from its stem.

2. The device of claim 1 wherein said jaws are each of semi-circular construction, mounted on approximately a diameter of the end of said tube, to lie substantially coincident with the circumference of said end of the tube when they are open and substantially at right angles to the first position when closed, one of said jaws provided with a lower, sharpened edge on its operative face, adapted to mate with the undersurface of the other of said jaws when the jaws are closed.

3. The device of claim 1 wherein said circuit means is provided with a hand-operated switch to disable said contact switch and to prevent actuation of said jaws.

4. The device of claim 1 wherein said contact switch comprises a thin resilient finger, a base mounted on the tube, a ground plate and a pair of contacts, one contact on said plate and the other contact on said finger, adjacent and facing said one contact, the contact on said resilient finger receiving current from said circuit means, said switch mounted at said other end of the tube, adjacent said jaws, so that the finger extends substantially coincident with a diameter of said other end of the tube, said finger adapted to be depressed by an individual fruit, to be picked, thus closing said contacts and thereby said jaws through energization of said electric actuating means by closing of said circuit means, said finger by its resiliency being adapted to permit passage of said fruit thereby, internally of said tube, and return to normal position, thus breaking said contacts and opening said jaws.

5. The device of claim 4 wherein said base is slotted to receive a bolt therethrough and to said tube, for adjustably securing said contact switch to said tube, said slot substantially parallel to the axis of the tube for placement of said finger dependent upon the diameter of the fruit to be picked.

6. A device for picking fruit comprising an elongated tube, handle means at one end of the tube, a pair of pivoting semi-circular cutting jaws mounted over the other end of the tube, and actuating means for said pair of jaws comprising mechanical means, including a pair of ears, one to each jaw oposite mating ends thereof, a pair of tie rods, one to each ear, and an elongated operating rod, extending substantially three-fourths of the length of the tube, parallel therewith, mounted thereon for sliding action, and secured at one end to the free ends of said tie rods, and electric actuating means including circuit means and a contact switch for energizing said electric means, said contact switch located over said other end of the tube, beneath said jaws and operatively connected to said electric actuating means by said circuit means, said electric actuating means connected to the free end of said operating rod, adjacent said handle means, so that when the mouth of the tube is placed immediately below an individual fruit and moved upwardly, said fruit will close said switch, thereby energizing said electric means to close said jaws, through movement of said operating and tie rods, to sever said fruit from its stem.

7. The device of claim 6 wherein said operating rod is provided with return means to move said jaws to an open position upon breaking of said circuit means and consequent de-energization of said electric actuating means.

8. The device of claim 6 wherein said ears, tie rods and operating rods are arranged to cause said jaws to close upon movement of said operating rod away from said other end, parallel with said tube, and said jaws to open upon movement of said operating rod toward said other end, parallel with said tube.

9. A device for picking fruit comprising an elongated tube, handle means at one end of the tube, a pair of pivoting, semi-circular cutting jaws mounted over the other end of the tube, mechanical linking means for opening and closing said jaws, an operating rod to actuate said jaws through said linking means and electric means for moving the operating rod comprising solenoid means located rear said one end, and operatively connected to said rod, electric circuit means for energizing said solenoid means, and a contact switch, for breaking and closing said circuit means, located on said other end of the tube, beneath the jaws when said jaws are in a closed position, so that upon contact of an individual fruit with said switch, said circuit is closed, thus energizing said solenoids means causing said rod to close said jaws, through said linking means, over the outer circumference of said individual fruit, and severing said fruit from its stem.

10. The device of claim 9 wherein said solenoid means includes at least a first and a second solenoid arranged along a common axis with said operating rod, each solenoid having a winding and a core, each core having a bore therein, said rod slidably mounted through the core of said first solenoid and fixed to the core of said second solenoid, a rigid collar attached to the operating rod adjacent the working face of said first core, said first core within the field of force of said first solenoid, said second core just outside of the field of force of said second solenoid, so that upon energization of both solenoids, the first core will move the operating rod a sufficient distance to allow the second core to be affected by the field of force of the second solenoid, said second core thus moving the rod an additional distance to close said jaws through said operating rod and said linking means.

11. The device of claim 10 wherein return spring means is provided for opening said jaws upon de-energization of said solenoids, through action of said linking means and said operating rod, said spring means attached to the operating rod and to the body of said first solenoid.

12. The device of claim 10 wherein said solenoids are provided with stop means, adjustably securable along the axis of said tube, and mounted one to each of said cores therebelow for limiting travel of said cores upon de-energization of said solenoids.

13. The device of claim 10 wherein the operative portion of said contact switch comprises a thin resilient finger, movable by said fruit to close said circuit means and energize said solenoids, and sufficiently resilient to permit said fruit to pass thereby, internally of said tube, and return to noraml position, thus breaking said circuit means and de-energizing said solenoids.

References Cited

UNITED STATES PATENTS

| 2,475,687 | 7/1949 | Baker | 56—333 |
| 2,990,669 | 7/1961 | Klemm | 56—334 |
| 3,165,880 | 1/1965 | Buie | 56—336 |
| 3,175,329 | 3/1965 | Beckman | 47—1 |

ABRAHAM G. STONE, *Primary Examiner.*

RUSSELL R. KINSEY, *Examiner.*